(12) United States Patent
Chirico

(10) Patent No.: US 7,946,557 B2
(45) Date of Patent: May 24, 2011

(54) PRESSURE-BALANCED VALVE AND ACTUATOR ASSEMBLY IN A PROCESS CONTROL SYSTEM AND METHOD

(75) Inventor: Salvatore Chirico, Burnaby (CA)

(73) Assignee: Honeywell International Inc., Morristown, NJ (US)

( * ) Notice: Subject to any disclaimer, the term of this patent is extended or adjusted under 35 U.S.C. 154(b) by 856 days.

(21) Appl. No.: 11/474,682

(22) Filed: Jun. 26, 2006

(65) Prior Publication Data
US 2007/0295927 A1    Dec. 27, 2007

(51) Int. Cl.
*F16K 39/00*    (2006.01)
(52) U.S. Cl. ........................................... 251/282
(58) Field of Classification Search .................. 251/282, 251/281, 335, 3
See application file for complete search history.

(56) References Cited

U.S. PATENT DOCUMENTS

| 907,771 | A | * | 12/1908 | Fulton ...................... 137/625.34 |
| 2,783,020 | A | * | 2/1957 | Kleczek ........................ 251/63.5 |
| 2,850,037 | A |   | 9/1958 | Van Eysbergen |
| 2,897,836 | A | * | 8/1959 | Peters et al. ................ 137/454.5 |
| 2,963,043 | A | * | 12/1960 | Davis et al. ....................... 92/42 |
| 3,010,695 | A | * | 11/1961 | Banks ........................... 251/205 |
| 3,214,134 | A | * | 10/1965 | Noakes .......................... 251/282 |
| 3,273,590 | A |   | 9/1966 | Woodward |
| 3,298,389 | A | * | 1/1967 | Freeman .................... 137/454.6 |
| 3,331,583 | A | * | 7/1967 | Backer ......................... 251/63.5 |
| 3,389,796 | A | * | 6/1968 | Fiala et al. .................... 210/130 |
| 3,393,702 | A |   | 7/1968 | Ferrill |
| 3,620,501 | A |   | 11/1971 | Friedell |
| 3,627,257 | A | * | 12/1971 | Stampfli .................. 251/129.07 |
| 4,662,398 | A | * | 5/1987 | Wywailowski et al. ... 137/625.4 |
| 4,706,932 | A | * | 11/1987 | Yoshida et al. ................. 251/31 |
| 4,796,854 | A | * | 1/1989 | Ewing ...................... 251/129.07 |
| 5,271,428 | A | * | 12/1993 | Dunn et al. ................... 137/509 |
| 6,394,418 | B1 | * | 5/2002 | Duan et al. ................. 251/335.3 |

FOREIGN PATENT DOCUMENTS

| DE | 869586 | C |   | 3/1953 |
| EP | 1074770 | A |   | 2/2001 |
| FR | 2775048 | A |   | 8/1999 |
| GB | 872909 | A |   | 7/1961 |
| GB | 884558 | A |   | 12/1961 |
| GB | 2416382 | A |   | 1/2006 |
| WO | WO 2004063463 | A1 | * | 7/2004 |

\* cited by examiner

*Primary Examiner* — John K Fristoe, Jr.
*Assistant Examiner* — Marina Tietjen
(74) *Attorney, Agent, or Firm* — Munck Carter, LLP

(57) ABSTRACT

An actuator-valve assembly includes a housing, which has an inlet operable to allow material to enter the housing and an outlet operable to allow the material to exit the housing. The actuator-valve assembly also includes a valve operable to control a flow of the material into the outlet. In addition, the actuator-valve assembly includes an actuator operable to move the valve, where the actuator includes a resilient member. At least one of the valve and the resilient member has one or more dimensions such that forces applied against the valve and the resilient member by the material are approximately balanced. For example, the one or more dimensions could be selected such that a net force applied against the valve and the resilient member by the material is within a specified threshold. The specified threshold could represent a percentage of a force provided by a control signal received by the actuator-valve assembly.

21 Claims, 3 Drawing Sheets

PRESSURE-BALANCED VALVE AND ACTUATOR ASSEMBLY IN A PROCESS CONTROL SYSTEM AND METHOD

TECHNICAL FIELD

This disclosure relates generally to control systems and more specifically to a pressure-balanced valve and actuator assembly in a process control system and method.

BACKGROUND

Processing facilities are often managed using process control systems. Example processing facilities include manufacturing plants, chemical plants, crude oil refineries, and ore processing plants. Among other operations, process control systems typically manage the use of valves, actuators, and other industrial equipment in the processing facilities.

In conventional process control systems, controllers are often used to control the operation of the industrial equipment in the processing facilities. The controllers could, for example, monitor and control the operation of the industrial equipment and generate alarms when malfunctions occur. As a particular example, a processing facility could include valves controlling the flow of materials in the processing facility, and controllers could control actuators that open and close the valves to control the process.

SUMMARY

This disclosure provides a pressure-balanced valve and actuator assembly in a process control system and method.

In a first embodiment, an apparatus includes a housing, which has an inlet operable to allow material to enter the housing and an outlet operable to allow the material to exit the housing. The apparatus also includes a valve operable to control a flow of the material into the outlet. In addition, the apparatus includes an actuator operable to move the valve, where the actuator includes a resilient member. At least one of the valve and the resilient member has one or more dimensions such that forces applied against the valve and the resilient member by the material are approximately balanced.

In particular embodiments, the actuator further includes a stem coupling the valve to an endplate. The valve includes a first surface associated with the stem, a second surface associated with the outlet, and a tapered or contoured third surface between the first and second surfaces. The one or more dimensions include at least one of a cross-sectional area or diameter of the resilient member, a cross-sectional area or diameter of the stem, an area or diameter of the first surface, an area or diameter of the second surface, and a taper or contour of the third surface.

In other particular embodiments, the stem is positioned so as to pass through a flange, and the resilient member is positioned between the flange and the endplate. Also, no seal is present where the stem passes through the flange such that at least some of the material that enters the housing is able to enter a portion of the housing containing the resilient member. In addition, the apparatus does not generate significant backpressure or vacuum caused by movement of the actuator requiring venting into an external environment.

In a second embodiment, a system includes a pipe operable to transport material and a valve-actuator assembly. The valve-actuator assembly includes a housing having an inlet operable to allow the material to enter the housing and an outlet operable to allow the material to exit the housing. The valve-actuator assembly also includes a valve operable to control a flow of the material into the outlet and an actuator operable to move the valve. The actuator includes a resilient member. At least one of the valve and the resilient member has one or more dimensions such that a net force applied against the valve and the resilient member by the material is within a specified threshold.

In a third embodiment, a method includes selecting one or more dimensions for at least one of a valve and a resilient member. The valve is to control a flow of material, and the resilient member is to facilitate movement of the valve. The method also includes determining, using the one or more dimensions, whether forces to be applied against the valve and the resilient member by the material would be approximately balanced. If the forces would not be approximately balanced, the method further includes modifying at least one of the one or more dimensions. In addition, if the forces would be approximately balanced, the method includes using an actuator-valve assembly having the valve and the resilient member with the one or more dimensions in a process control system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
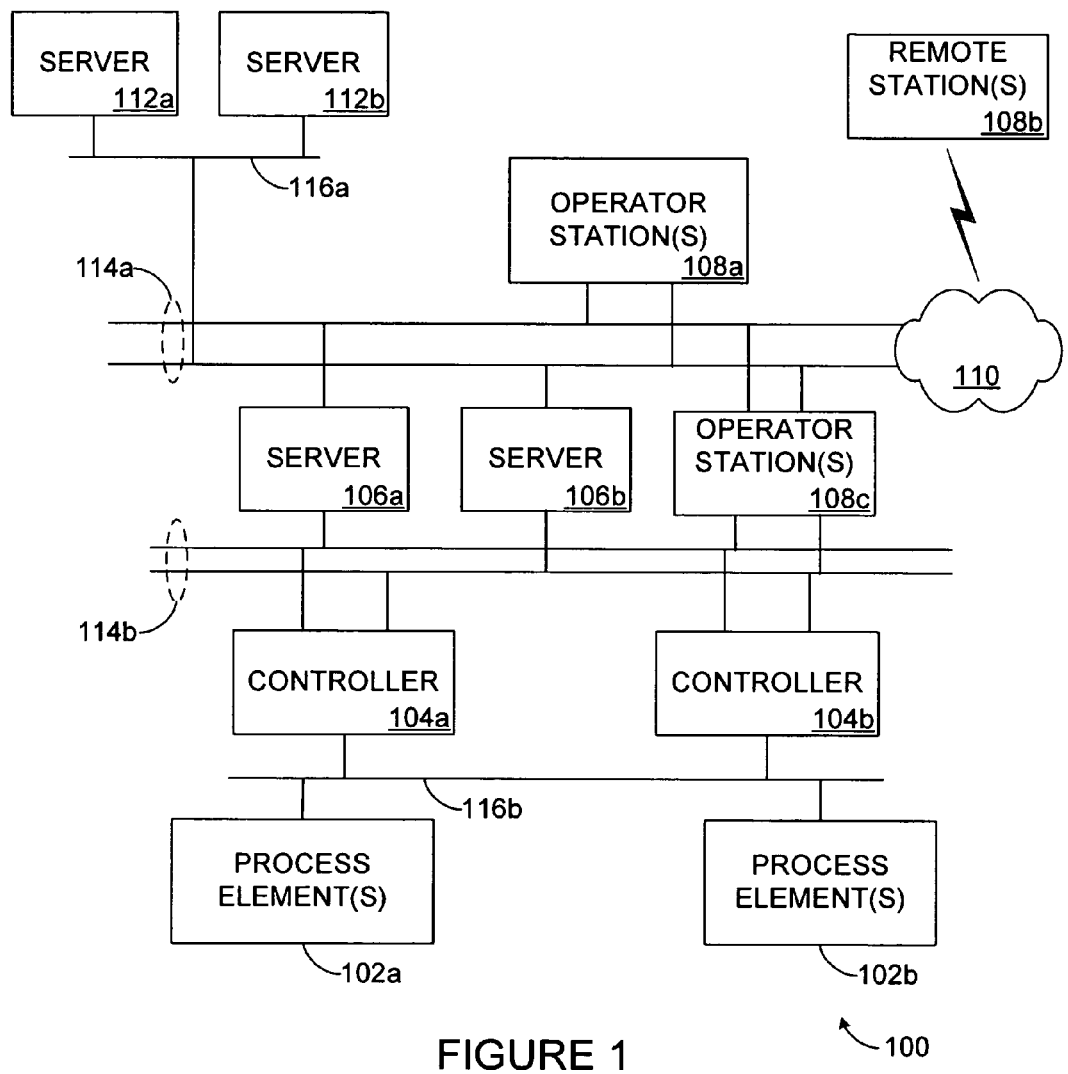
FIG. 1 illustrates an example process control system in accordance with this disclosure.

FIG. 1 illustrates an example process control system 100 in accordance with this disclosure. The embodiment of the process control system 100 shown in FIG. 1 is for illustration only. Other embodiments of the process control system 100 may be used without departing from the scope of this disclosure.

Figure 2:
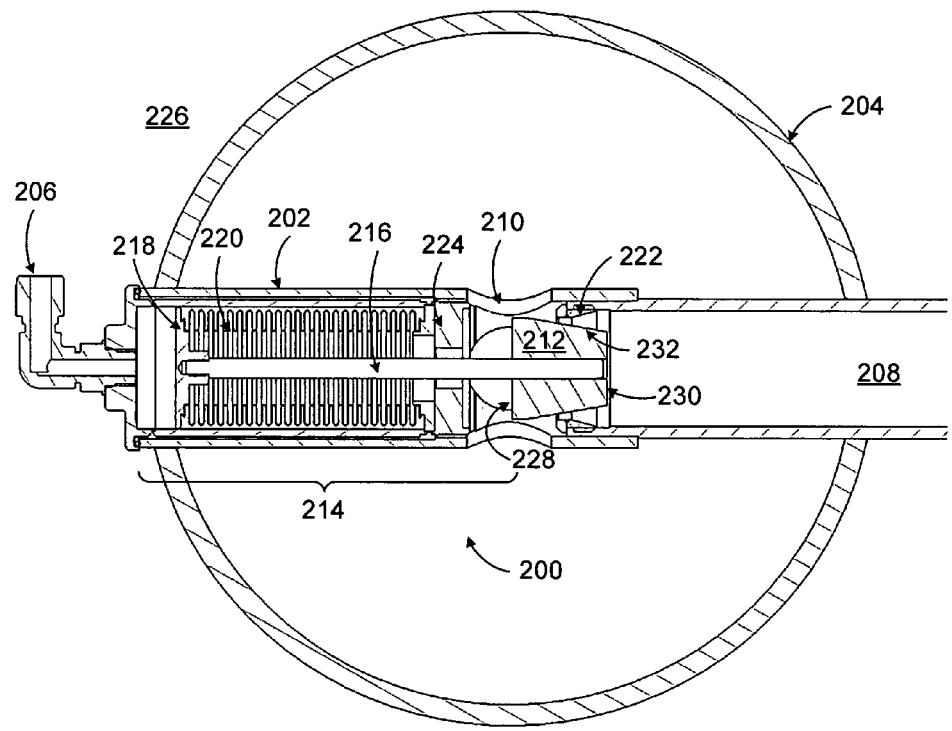
FIG. 2 illustrates an example pressure-balanced valve-actuator assembly in a process control system in accordance with this disclosure.

In this example embodiment, the process control system 100 includes one or more process elements 102a-102b. The process elements 102a-102b represent components in a process or production system that may perform any of a wide variety of functions. For example, the process elements 102a-102b could represent equipment used to manufacture paper, chemical, or pharmaceutical products. As a particular example, a process element could represent a valve-actuator assembly having a valve for controlling the flow of one or more materials (such as one or more liquids, gases, or other fluids) and an actuator for opening and closing the valve. Each of the process elements 102a-102b includes any hardware, software, firmware, or combination thereof for performing one or more functions in a process or production system. One example of a valve-actuator assembly is shown in FIG. 2, which is described below.

Two controllers 104a-104b are coupled to the process elements 102a-102b. The controllers 104a-104b control the operation of the process elements 102a-102b. For example, the controllers 104a-104b could be capable of providing control signals to the process elements 102a-102b, such as signals used by actuators to open and close valves. Each of the controllers 104a-104b includes any hardware, software, firmware, or combination thereof for controlling one or more of the process elements 102a-102b. The controllers 104a-104b could, for example, include one or more processors and one or more memories storing data and instructions used by the processor(s). As particular examples, the processors could include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. Each of the servers 106a-106b could, for example, include one or more processors and one or more memories storing data and instructions used by the processor(s). As particular examples, the processors could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing direct user access to the controllers 104a-104b. As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. Each of the operator stations 108a-108c could, for example, include one or more processors and one or more memories storing data and instructions used by the processor(s). In particular embodiments, the operator stations 108a-108c could represent personal computers executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116b that support communication between components in the system 100. Each of these networks 114a-114b, 116a-116b represents any suitable network or combination of networks facilitating communication between components in the system 100. The networks 114a-114b, 116a-116b could, for example, represent Ethernet networks.

In one aspect of operation, one or more process elements 102a-102b represent valve-actuator assemblies. A valve-actuator assembly generally includes a valve for controlling the flow of material and an actuator for opening and closing the valve. In many conventional actuators, movement of the actuator results in elongation or compression of a resilient member, and backpressure or vacuum is generated that needs to be vented to the atmosphere. In accordance with this disclosure, the valve-actuator assembly is statically or completely sealed from its environment, and the requirement to vent backpressure or vacuum is eliminated (as little or none is generated in the first place). This may be achieved by permitting a controlled material (such as a process fluid) to freely enter the actuator. Process control is achieved by designing the valve-actuator assembly so that the net force on the valve in the valve-actuator assembly is at or near zero. The valve-actuator assembly can also be designed so as to omit a dynamic seal normally used in conventional actuators, while still ensuring that no material (process fluid) leaks into the valve-actuator assembly's environment. Among other things, this may allow the valve-actuator assembly to control a material flow having a relatively high pressure and still be physical small.

Although FIG. 1 illustrates one example of a process control system 100, various changes may be made to FIG. 1. For example, a control system could include any number of process elements, controllers, servers, operator stations, and networks. Also, the makeup and arrangement of the process control system 100 is for illustration only. Components could be added, omitted, combined, or placed in any other suitable configuration according to particular needs. Further, while described as being used to produce certain products, the process control system 100 could be used in any other suitable manner. In addition, FIG. 1 illustrates one operational environment in which a valve-actuator assembly can be used. The valve-actuator assembly could be used in any other suitable device or system.

FIG. 2 illustrates an example pressure-balanced valve-actuator assembly 200 in a process control system in accordance with this disclosure. The embodiment of the valve-actuator assembly 200 shown in FIG. 2 is for illustration only. Other embodiments of the valve-actuator assembly 200 could be used without departing from the scope of this disclosure. Also, for ease of explanation, the valve-actuator assembly 200 is described as operating in the process control system 100 of FIG. 1. The valve-actuator assembly 200 could be used in any other suitable device or system.

As shown in FIG. 2, the valve-actuator assembly 200 includes a housing 202. The housing 202 generally represents a structure capable of holding or accommodating the other components of the valve-actuator assembly 200. The housing 202 could have any suitable size and shape, such as a generally cylindrical shape. The housing 202 could also be formed from any suitable material or materials, such as a material compatible with the environment in which the valve-actuator assembly 200 is used.

In this example, the housing 202 (along with the components it houses) mainly resides within a pipe 204. The pipe 204 generally represents any suitable structure capable of transporting one or more materials, such as fluids like liquids or gasses. As a particular example, the pipe 204 could represent a steam tunnel capable of carrying steam used during a paper-making process.

A control inlet 206 typically resides outside of or is otherwise accessible outside of the pipe 204. The control inlet 206 is capable of receiving a control signal, which controls how the valve-actuator assembly 200 adjusts a valve. The control inlet 206 represents any suitable structure capable of receiving a control signal, such as a pneumatic air control signal.

An outlet 208 provides an exit for material to leave the pipe 204 via the valve-actuator assembly 200, such as an exit for steam from the pipe 204. For example, when a valve in the valve-actuator assembly 200 is closed, very little or no material may exit through the outlet 208. When the valve in the valve-actuator assembly 200 is at least partially open, material from the pipe 204 that enters the housing 202 through one or more inlets 210 may exit through the outlet 208, where the amount of material flowing through the outlet 208 varies based on the opening of the valve.

In this example, the valve-actuator assembly 200 also includes a valve 212 and an actuator 214. The actuator 214 includes a stem 216, an endplate 218, and a resilient member 220. The valve 212 generally controls the amount of material that can flow into the outlet 208. For example, the valve 212 may be pushed into an annular opening 222 to block or restrict the flow of material into the outlet 208. The valve 212 could also be pulled out of the annular opening 222 to allow material to enter into the outlet 208. The endplate 218 moves based on the control signal received through the control inlet 206, where movement of the endplate 218 results in movement of the valve 212 (due to the attached stem 216). In this way, the control signal can cause the endplate 218 to move the valve 212 into a desired position.

The resilient member 220 is located between the endplate 218 and a flange 224. The resilient member 220 generally expands and contracts longitudinally depending on the amount of pressure provided by the control signal received through the control inlet 206. For example, the resilient member 220 may contract and cause the endplate 218 to move towards the outlet 208, which causes the valve 212 to decrease or close the opening into the outlet 208. Similarly, the resilient member 220 may expand and cause the endplate 218 to move towards the control inlet 206, which causes the valve 212 to increase the opening into the outlet 208. In this way, the resilient member 220 may help to facilitate movement of the valve 212 in the valve-actuator assembly 200.

The resilient member 220 could include any suitable structure for facilitating movement of the valve 212. For example, the resilient member 220 could represent a spring or bellows. The spring or bellows could be formed from one or more metals, such as a nickel alloy like INCONEL 625, stainless steel, or titanium. In this example, the resilient member 220 may provide a spring-loaded force that maintains the valve 212 in a closed position until an adequate amount of pneumatic force is provided via the control inlet 206.

In particular embodiments, the resilient member 220 represents a multi-ply bellows formed from multiple layers or plies of material. The material in each ply could be the same, or the material could be different in different plies. As a particular example, one ply could be exposed to pneumatic air from the control inlet 206, and another ply could be exposed to steam from the pipe 204. In this example, each ply could be formed from a material or materials suitable to its environment, such as when the ply exposed to pneumatic air is formed from stainless steel and the ply exposed to steam is formed from a nickel alloy. This may help to increase the effective working lifespan of the valve-actuator assembly 200 because each ply can be customized (and possibly made substantially impervious) to its particular environment.

In conventional actuators, a seal is typically used to prevent material (such as steam) from entering the location where a resilient member is located. In accordance with this disclosure, the valve-actuator assembly 200 need not include a seal where the stem 216 passes through the flange 224. Also, venting of backpressure or vacuum into the ambient environment 226 may not be required in the valve-actuator assembly 200. In these embodiments, the valve 212 has a shape, diameter, and area that are proportional to the resilient member 220 (or vice versa). In this way, the forces applied to the valve-actuator assembly 200 by the material sent through the pipe 204 and the outlet 208 result in an approximately zero net force on the valve 212. As a result, the pressure of the material may have a negligible effect on the operation of the valve-actuator assembly 200, and venting of backpressure or vacuum into the ambient environment 226 may not be required. This may allow the valve-actuator assembly 200 to be completely sealed from the ambient environment 226. This could be particularly advantageous in certain situations, such as when the material being transported is of a hazardous nature.

In this example, the material in the pipe 204 (such as steam) can enter both the outlet 208 and at least a portion of the housing 202 where the resilient member 220 is located. This applies a pressure against both the resilient member 220 and against a surface 228 of the valve 212. Also, the outlet 208 may generally represent a lower pressure region than the pipe 204, which may result in a force applied against a surface 230 of the valve 212 as well as a force applied against a tapered (single or multiple tapers) or contoured surface 232 of the valve 212.

A pressure-balanced valve-actuator assembly 200 may be obtained when the following condition is met:

$$\text{Net Force} = F1 + F2 + F3 + F4 = 0. \quad (1)$$

Here, F1 represents the force applied against the resilient member 220 from material entering the inlets 210, and F2 through F4 represent the respective forces applied against the surfaces 228-232 of the valve 212.

Equation (1) can be modified to the following:

$$P1*(A1-A4) + P1*(A2-A4) + P3*A3 + P2*(A2-A3) = 0. \quad (2)$$

Here, P1 represents the pressure applied against the resilient member 220 and against the surface 228 of the valve 212 by the material entering the inlets 210. A1 represents the cross-sectional area of the resilient member 220, and A4 represents the cross-sectional area of the stem 216. A2 represents the area of the surface 228 of the valve 212. P3 represents the pressure in the outlet 208, and A3 represents the area of the surface 230 of the valve 212. P2 represents the pressure applied against the tapered surface 232 of the actuator 214.

In particular embodiments, P1 represents the pressure of the material (such as steam) in the pipe 204, which may be known or variable. Also, P3 represents the discharge pressure of the material in the outlet 208. In addition, P2 represents the pressure against the surface 232 of the valve 212 and is generally highly unstable, but this pressure can be modeled (such as by using computational fluid dynamics modeling). These values could be used to evaluate and select possible dimensions of the resilient member 220 and the valve 212. By selecting the appropriate dimensions, the forces applied to the valve 212 and the resilient member 220 in the valve-actuator assembly 200 could be balanced.

As particular examples, the resilient member 220 could have a diameter of 30.0 millimeters, and the stem 216 could have a diameter of 6.3 millimeters. Also, the surface 228 of the valve 212 could have a diameter of 26.9 millimeters, and the surface 230 of the valve 212 could have a diameter of 22.7 millimeters. In addition, the surface 232 of the valve 212 could have a five-degree taper. As another example, the surface 228 of the valve 212 could have a diameter of 31.0 millimeters, and the surface 232 of the valve 212 could have a ten-degree taper. These examples are for illustration only. Many possible configurations of the valve-actuator assembly 200 are possible by, among other things, modifying the outer diameter of the valve 212, the taper of the valve 212, the cross-sectional area of the resilient member 220, and the cross-sectional area of the stem 216. Also, each configuration could be suitable for a particular flow range, hence many configurations allow for a wide range of material flow.

Table 1 illustrates one possible computational fluid dynamics model for a valve 212 having a 27.0 millimeter outer diameter and a five degree taper. In this example, the valve 212 is used to control the flow of steam, and bellows are used as the resilient member 220.

TABLE 1

| Physical Properties | | Flow & Forces | | | | | |
|---|---|---|---|---|---|---|---|
| Depth & Area (mm) | Steam Supply Pres. (PSI) | Flow @ Outlet (kg/hr) | Net Force (+=Reduce Flow) (N) | Valve Side Wall (N) | Valve Back Surface (N) | Valve Front Surface (Eddies) (N) | Bellows Internal (Ae) (N) |
| 0 | 1 | 92 | 3.14 | 1.26 | 3.54 | 1.24 | −2.9 |
|  | 2 | 124 | 1.07 | −2.57 | 7.1 | 2.36 | −5.82 |
|  | 4 | 163 | 1.15 | −5.3 | 14.3 | 3.84 | −11.69 |
|  | 8 | 210 | 0.96 | −10.8 | 28.6 | 6.56 | −23.4 |
|  | 12 | 247 | 0.8 | −16.4 | 43 | 9.4 | −35.2 |
| 2 | 1 | 77 | 0.13 | −1.21 | 3.57 | 0.69 | −2.92 |
|  | 2 | 104 | 0.1 | −2.5 | 7.2 | 1.3 | −5.9 |
|  | 4 | 144 | 0.3 | −5 | 14.4 | 2.6 | −11.7 |
|  | 8 | 182 | −0.6 | −10.4 | 28.8 | 4.5 | −23.5 |
|  | 12 | 213 | −1.5 | −15.6 | 43.2 | 6.2 | −35.3 |
| 5 | 1 | 79 | 0.4 | −0.9 | 3.6 | 0.6 | −2.9 |
|  | 2 | 108 | 0.7 | −1.9 | 7.2 | 1.2 | −5.8 |
|  | 4 | 139 | 0.8 | −3.8 | 14.3 | 2 | −11.7 |
|  | 8 | 167 | 0.2 | −8.9 | 28.8 | 3.8 | −23.5 |
|  | 12 | 195 | −0.8 | −14.2 | 43.2 | 5.5 | −35.3 |
| 10 | 1 | 70 | 0.8 | −0.6 | 3.6 | 0.7 | −2.9 |
|  | 2 | 93 | 1.5 | −1.2 | 7.2 | 1.4 | −5.9 |
|  | 4 | 117 | 2.6 | −2.6 | 14.3 | 2.7 | −11.8 |
|  | 8 | 144 | 3.7 | −6.7 | 28.7 | 5.3 | −23.6 |
|  | 12 | 166 | 4.8 | −10.9 | 43.1 | 8 | −35.4 |
| 20 | 1 | 46 | 0.9 | −0.1 | 3.6 | 0.3 | −2.9 |
|  | 2 | 56 | 1.9 | −0.1 | 7.2 | 0.7 | −5.9 |
|  | 4 | 84 | 2.6 | −0.7 | 14.4 | 0.7 | −11.8 |
|  | 8 | 93 | 5.1 | −2.5 | 28.8 | 2.4 | −23.6 |
|  | 12 | 108 | 7.1 | −4.8 | 43.2 | 4.2 | −35.5 |
| 25 | 1 | 32 | 0.9 | 0.1 | 3.6 | 0.1 | −2.9 |
|  | 2 | 38 | 1.8 | 0.2 | 7.2 | 0.3 | −5.9 |
|  | 4 | 55 | 2.8 | 0 | 14.4 | 0.2 | −11.8 |
|  | 8 | 60 | 5.96 | −0.5 | 28.8 | 1.26 | −23.6 |
|  | 12 | 79 | 7.2 | −1.9 | 43.3 | 1.3 | −35.5 |

As shown here, the valve 212 may not be entirely balanced (as shown in the "Net Force" column), but the magnitude of the imbalance could be small compared to the control force available through the control inlet 206. As a result, this configuration could be acceptable.

Table 2 illustrates one possible computational fluid dynamics model for a valve 212 having a 31.0 millimeter outer diameter and a five degree taper.

TABLE 2

| Physical Properties | | Flow & Forces | | | | | |
|---|---|---|---|---|---|---|---|
| Depth & Area (mm) | Steam Supply Pres. (PSI) | Flow @ Outlet (kg/hr) | Net Force (+=Reduce Flow) (N) | Valve Side Wall (N) | Valve Back Surface (N) | Valve Front Surface (Eddies) (N) | Bellows Internal (Ae) (N) |
| 0 | 1 | 108 | 1.8 | −1.43 | 4.73 | 1.34 | −2.84 |
|   | 2 | 148 | 3.63 | −2.89 | 9.5 | 2.71 | −5.69 |
|   | 4 | 194 | 6.6 | −6 | 19.1 | 4.9 | −11.4 |
|   | 8 | 243 | 11.7 | −12.3 | 38.4 | 8.6 | −23 |
|   | 12 | 285 | 15.5 | −18.8 | 57.6 | 11.2 | −34.5 |
| 2 | 1 | 93 | 1.77 | −1.35 | 4.76 | 1.21 | −2.85 |
|   | 2 | 129 | 3.54 | −2.73 | 9.5 | 2.47 | −5.7 |
|   | 4 | 172 | 7 | −5.6 | 19.2 | 4.9 | −11.5 |
|   | 8 | 212 | 12.4 | −11.9 | 38.4 | 8.9 | −23 |
|   | 12 | 248 | 16.5 | −18.2 | 57.7 | 11.6 | −34.6 |
| 5 | 1 | 92 | 1.91 | −1 | 4.76 | 1 | −2.85 |
|   | 2 | 126 | 3.8 | −2.1 | 9.5 | 2.1 | −5.7 |
|   | 4 | 163 | 6.6 | −4.2 | 19.2 | 3.1 | −11.5 |
|   | 8 | 195 | 12.5 | −10.1 | 38.5 | 7.2 | −23.1 |
|   | 12 | 226 | 17.3 | −16.1 | 57.7 | 10.3 | −34.6 |
| 10 | 1 | 87 | 2.17 | −0.43 | 4.76 | 0.7 | −2.86 |
|   | 2 | 113 | 4.09 | −1 | 9.56 | 1.26 | −5.73 |
|   | 4 | 137 | 7.25 | −2.52 | 19.2 | 2.07 | −11.5 |
|   | 8 | 167 | 13.1 | −7.1 | 38.5 | 4.8 | −23.1 |
|   | 12 | 193 | 17.9 | −11.7 | 57.8 | 6.5 | −34.7 |
| 20 | 1 | 56 | 2.38 | 0.12 | 4.84 | 0.3 | −2.88 |
|   | 2 | 70 | 4.77 | 0.18 | 9.68 | 0.68 | −5.77 |
|   | 4 | 84 | 9.18 | 0.08 | 19.4 | 1.3 | −11.6 |
|   | 8 | 102 | 15 | −2.2 | 38.8 | 1.5 | −23.1 |
|   | 12 | 119 | 22.4 | −4.2 | 58.2 | 3.1 | −34.7 |
| 25 | 1 | 39 | 2.38 | 0.3 | 4.84 | 0.14 | −2.9 |
|   | 2 | 47 | 5.01 | 0.6 | 9.7 | 0.49 | −5.78 |
|   | 4 | 56 | 9.21 | 0.65 | 19.4 | 0.72 | −11.56 |
|   | 8 | 69 | 16.74 | −0.06 | 38.8 | 1.2 | −23.2 |
|   | 12 | 92 | 22.84 | −1.4 | 58.2 | 0.74 | −34.7 |

In this example, the valve 212 is not balanced, and the magnitude of the imbalance is relatively large (as shown by the bolded values in the "Net Force" column). As a result, this configuration may not be acceptable.

Although FIG. 2 illustrates one example of a pressure-balanced valve-actuator assembly 200 in a process control system, various changes may be made to FIG. 2. For example, while many of the components in FIG. 2 may have a generally cylindrical shape, the relative sizes and shapes of the various components in FIG. 2 are for illustration only.

Figure 3:
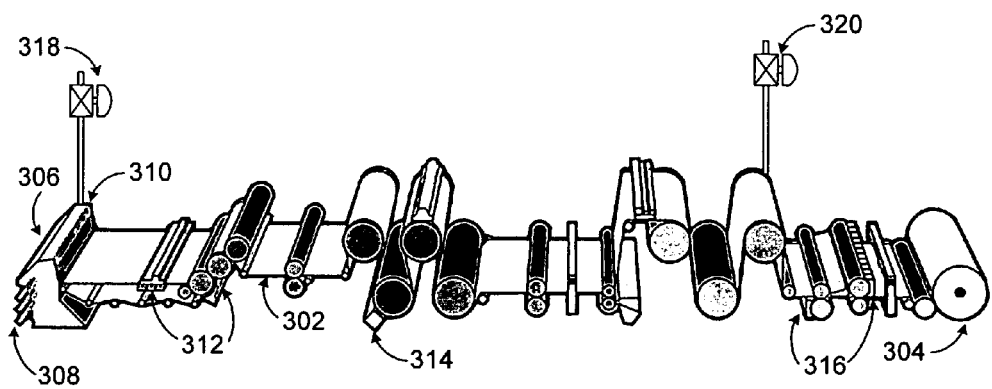
FIG. 3 illustrates a specific process control system having one or more pressure-balanced valve-actuator assemblies in accordance with this disclosure.

FIG. 3 illustrates a specific process control system 300 having one or more pressure-balanced valve-actuator assemblies in accordance with this disclosure. The embodiment of the process control system 300 shown in FIG. 3 is for illustration only. Other embodiments of the process control system 300 may be used without departing from the scope of this disclosure.

In this example, the process control system 300 includes a paper-making machine used to produce a paper product. More specifically, the various components may be used to produce a paper sheet 302 collected at a reel 304. As shown in FIG. 3, the paper-making machine includes a headbox 306, which distributes a pulp suspension uniformly across the machine onto a continuous moving wire screen or mesh. The pulp suspension entering the headbox 306 may contain, for example, 0.2-3% wood fibers and/or other solids, with the remainder of the suspension being water. The headbox 306 may include an array of dilution actuators 308, which distributes dilution water into the pulp suspension across the sheet. The dilution water may be used to help ensure that the resulting paper sheet 302 has a more uniform basis weight across the sheet. The headbox 306 may also include an array of slice lip actuators 310, which controls a slice opening across the machine from which the pulp suspension exits the headbox 306 onto the moving wire screen or mesh. The array of slice lip actuators 310 may also be used to control the basis weight of the paper sheet 302.

Arrays of steam actuators 312 produce hot steam that penetrates the paper sheet 302 and releases the latent heat of the steam into the paper sheet 302, thereby increasing the temperature of the paper sheet 302. The increase in temperature may allow for easier removal of water from the paper sheet 302. An array of rewet shower actuators 314 adds small droplets of water (which may be air atomized) onto the surface of the paper sheet 302. The array of rewet shower actuators 314 may be used to control the moisture profile of the paper sheet 302, reduce or prevent over-drying of the paper sheet 302, or correct any dry streaks in the paper sheet 302.

The paper sheet 302 is then passed through several nips of counter rotating rolls. An array of induction heating actuators 316 heats the shell surface of a roll, such as an iron roll. As the roll surface locally heats up, the roll diameter is locally expanded and hence increases nip pressure, which in turn locally compresses the paper sheet 302. The array of induction heating actuators 316 may therefore be used to control the caliper (thickness) profile of the paper sheet 302.

Two additional actuators 318-320 are shown in FIG. 3. A thick stock flow actuator 318 controls the consistency of the incoming pulp received at the headbox 306. A steam flow actuator 320 controls the amount of steam transferred to the steam actuators 312. The actuators 318-320 could, for example, control valves regulating the flow of pulp and steam, respectively. Additional components could be used to further process the paper sheet 302, such as a supercalender for improving the paper sheet's thickness, smoothness, and gloss.

In some embodiments, the pressure-balanced valve-actuator assembly 200 shown in FIG. 2 could be used in the process control system 300. For example, one or more of the steam actuators 312 could be implemented using one or more pressure-balanced valve-actuator assemblies 200. In this way, the steam actuators 312 could be implemented as statically sealed components in the process control system 300. Not only that, as described above, the resilient member 220 in the valve-actuator assemblies 200 could represent multi-ply bellows, where each ply is adapted for a specific environment. When used as steam actuators 312, the valve-actuator assemblies 200 could include a bellows ply adapted for use in hot environments (such as up to 250° C. or more). The ply could also be adapted to handle exposure to harsh materials, such as caustic cleaning agents like sodium hydroxide or wet/dry steam with chemical additives like chlorines or chlorides. In addition, the ply can be adapted for exposure to pulp and paper residue and hot condensate with increasing concentrations of precipitates, and the ply could be adapted to handle thermal cycling (such as cycling of 20° C. to 200° C.).

Although FIG. 3 illustrates one specific example of a process control system 300 having one or more pressure-balanced valve-actuator assemblies, various changes may be made to FIG. 3. For example, any number of pressure-balanced valve-actuator assemblies 200 could be used in the process control system 300 to perform any suitable function(s) in the process control system 300. Also, this represents one specific type of process that may be used to produce a paper product. Other processes could be used that include any other or additional components for producing a paper product.

Figure 4:
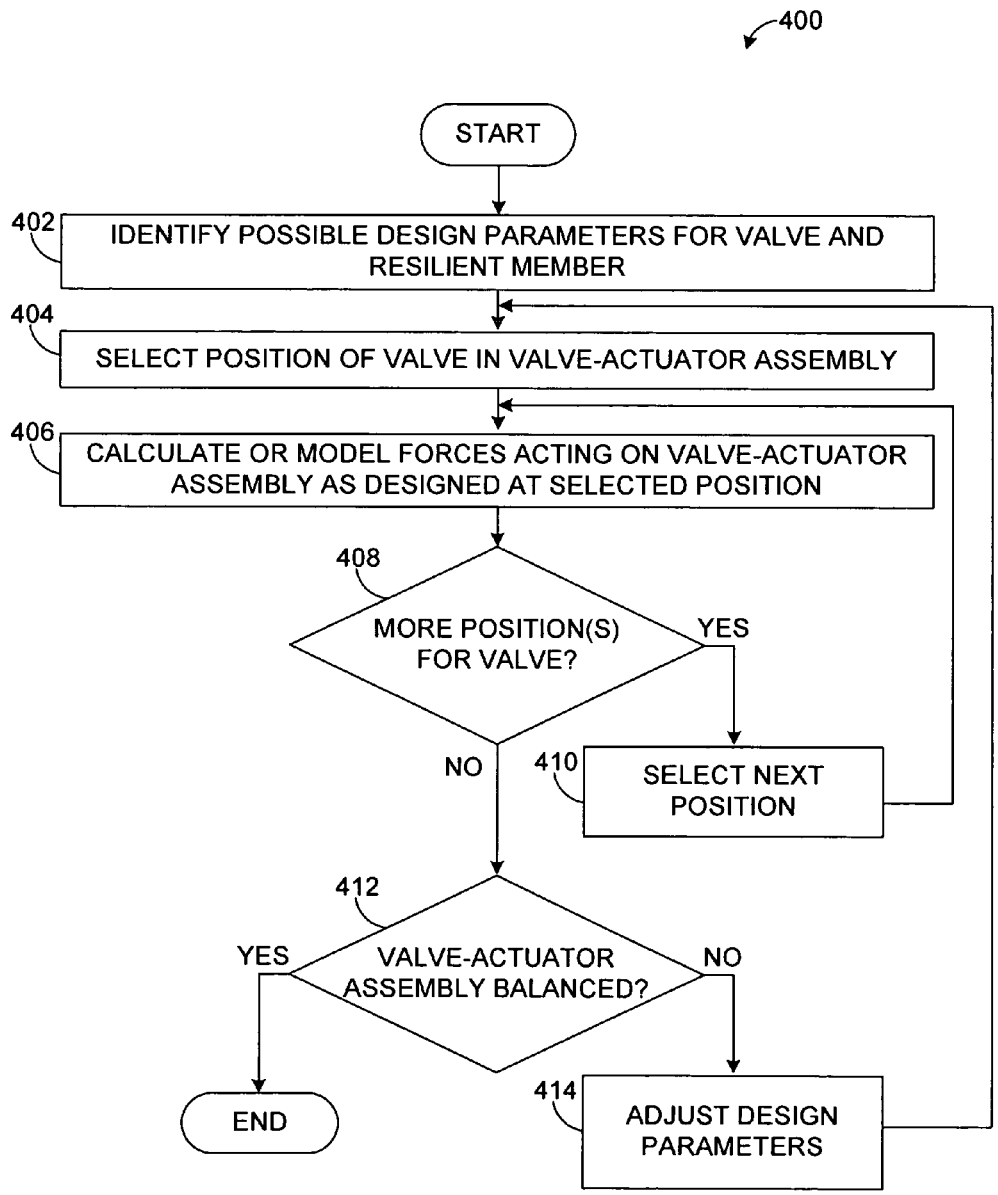
FIG. 4 illustrates an example method for designing a pressure-balanced valve-actuator assembly in a process control system in accordance with this disclosure.

FIG. 4 illustrates an example method 400 for designing a pressure-balanced valve-actuator assembly in a process control system in accordance with this disclosure. For ease of explanation, the method 400 is described with respect to the pressure-balanced valve-actuator assembly 200 of FIG. 2. The method 400 could be used with any other suitable valve-actuator assembly. Also, in particular embodiments, the method 400 could be implemented by executing a computer program, although other implementations of the method 400 could be used.

Possible design parameters of a valve-actuator assembly 200 are identified at step 402. The design parameters could include the outer diameter and taper or contour of the valve 212 or the diameter of the resilient member 220. As a particular example, this may include a computer program suggesting possible values for the outer diameter and taper or contour of the valve 212 or the diameter of the resilient member 220.

A position of the valve 212 in the pressure-balanced valve-actuator assembly 200 is selected at step 404. This may include, for example, selecting one of the most extreme positions obtainable by the valve-actuator assembly 200, such as the most opened or most closed position of the valve 212.

The estimated forces acting on the valve-actuator assembly 200 in a particular environment are calculated or modeled at step 406. For example, computational fluid dynamics modeling could be used to estimate the forces acting on the various surfaces of the valve 212 and the resilient member 220. The calculations or models are based on the selected design parameters and assume that the valve 212 is located at the selected position in the valve-actuator assembly 200.

If more valve positions remain to be tested at step 408, the next position of the valve 212 is selected at step 410. This may include, for example, incrementing the selected valve position by a specified amount or selecting the next default valve position to be tested. The next default position could be the other extreme position of the valve 212. The method 400 then returns to step 406 to determine the forces acting on the valve 212 at the new selected location for the valve 212.

A determination is made whether the valve-actuator assembly 200 with the current design parameters is balanced at step 412. This may include, for example, determining if the forces computed in step 406 result in a net force on the valve 212 of approximately zero. As a particular example, this could include determining if the net force on the valve 212 falls within a specified threshold force. The threshold force could have any suitable value, such as a value close to zero or that is some specified percentage (such as twenty to thirty percent) of the expected force provided by a control signal.

If not, one or more of the design parameters are modified at step 414. This could include changing the taper or outer diameter of the valve 212. Steps 404-412 are then repeated to determine if the new design parameters result in a balanced valve-actuator assembly 200. If the valve-actuator assembly 200 is balanced, the method 400 ends. At this point, a valve-actuator assembly 200 with the specified design parameters can be installed and used in a particular application.

In this example, a slight net force imbalance can be experienced by the valve 212 during operation. However, if this imbalance is minor, it may fail to affect the travel of the valve 212 in a significant manner. In some embodiments, a net force imbalance may affect the travel of the valve 212 less significantly when the valve 212 has a smaller taper or contour. Larger tapers or contours could impact the balance of the valve-actuator assembly 200 more.

Although FIG. 4 illustrates one example of a method 400 for designing a pressure-balanced valve-actuator assembly in a process control system, various changes could be made to FIG. 4. For example, although shown as calculating or modeling forces for all positions before analyzing the results, the results could be analyzed as they are calculated or modeled or in any other suitable progression. Also, the method 400 of FIG. 4 could be substantially or completely automated, where a user selects desired characteristics of a valve-actuator assembly 200 and provides any other required data, and a computing or other device automatically selects and analyzes possible design parameters matching the user's criteria.

In some embodiments, various functions described in this disclosure are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used in this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
    a housing including an inlet operable to allow material to enter the housing and an outlet operable to allow the material to exit the housing;
    a valve operable to control a flow of the material into the outlet; and
    an actuator operable to move the valve, the actuator including a resilient member and a stem coupling the valve to an endplate;
    wherein at least one of the valve and the resilient member has one or more dimensions such that forces applied against the valve and the resilient member by pressures from the material are approximately balanced when the valve is in any of a plurality of positions, the plurality of positions including a most open position and a most closed position;
    wherein the stem is arranged to pass through a flange, the stem operable to move with respect to the flange, the resilient member positioned between the flange and the endplate;
    wherein no seal is present where the stem passes through the flange such that at least some of the material that enters the housing enters a portion of the housing containing the resilient member between the stem and the flange; and
    wherein the forces are approximately balanced only as a function of pressure from the material being applied against the valve and pressure of the material entering the portion of the housing between the stem and the flange being applied against the resilient member.

2. The apparatus of claim 1, wherein the one or more dimensions are selected such that a net force applied against the valve and the resilient member by the material is within a specified threshold.

3. The apparatus of claim 1, wherein the forces that are approximately balanced include only (i) a force against a first surface associated with the stem, (ii) a force against a second surface associated with the outlet, (iii) a force against a tapered or contoured third surface between the first and second surfaces, and (iv) a force against the resilient member.

4. The apparatus of claim 1, wherein the valve includes a first surface associated with the stem, a second surface associated with the outlet, and a tapered or contoured third surface between the first and second surfaces.

5. The apparatus of claim 4, wherein the one or more dimensions include at least one of: a cross-sectional area or diameter of the resilient member, a cross-sectional area or diameter of the stem, an area or diameter of the first surface, an area or diameter of the second surface, and a taper or contour of the third surface.

6. The apparatus of claim 5, wherein the one or more dimensions are selected so that:

$$P1*(A1-A4)+P1*(A2-A4)+P3*A3+P2*(A2-A3)<\text{Threshold};$$

where A1 is the cross-sectional area or diameter of the resilient member, A2 is the area or diameter of the first surface, A3 is the area or diameter of the second surface, A4 is the cross-sectional area or diameter of the stem, P1 is pressure of the material at the inlet, P2 is pressure of the material applied against the third surface, and P3 is pressure of the material at the outlet.

7. The apparatus of claim 1, wherein the apparatus is not operable to generate significant backpressure or vacuum caused by movement of the actuator requiring venting into an external environment.

8. The apparatus of claim 1, wherein the resilient member includes at least one of: a spring and a bellows.

9. The apparatus of claim 1, wherein the resilient member includes a multi-ply bellows, one of the plies operable to be exposed to a control signal controlling movement of the actuator, another of the plies operable to be exposed to the material.

10. A system, comprising:
    a pipe operable to transport material; and
    a valve-actuator assembly including:
        a housing including an inlet operable to allow the material to enter the housing and an outlet operable to allow the material to exit the housing;
        a valve operable to control a flow of the material into the outlet; and
        an actuator operable to move the valve, the actuator including a resilient member and a stem coupling the valve to an endplate;
    wherein at least one of the valve and the resilient member has one or more dimensions such that forces applied against the valve and the resilient member by pressures from the material are approximately balanced when the valve is in any of a plurality of positions, the plurality of positions including a most open position and a most closed position;
    wherein the stem is arranged to pass through a flange, the stem operable to move with respect to the flange, the resilient member positioned between the flange and the endplate;
    wherein no seal is present where the stem passes through the flange such that at least some of the material that enters the housing enters a portion of the housing containing the resilient member between the stem and the flange; and
    wherein the forces are approximately balanced only as a function of pressure from the material being applied against the valve and pressure of the material entering the portion of the housing between the stem and the flange being applied against the resilient member.

11. The system of claim 10, wherein the valve includes a first surface associated with the stem, a second surface associated with the outlet, and a tapered or contoured third surface between the first and second surfaces.

12. The system of claim 11, wherein the one or more dimensions include at least one of: a cross-sectional area or diameter of the resilient member, a cross-sectional area or diameter of the stem, an area or diameter of the first surface, an area or diameter of the second surface, and a taper or contour of the third surface.

13. The system of claim 10, wherein the forces that are approximately balanced include only (i) a force against a first surface associated with the stem, (ii) a force against a second surface associated with the outlet, (iii) a force against a tapered or contoured third surface between the first and second surfaces, and (iv) a force against the resilient member.

14. The system of claim 10, wherein the valve-actuator assembly is not operable to generate significant backpressure or vacuum caused by movement of the actuator requiring venting into an external environment.

15. The system of claim 10, wherein the resilient member includes at least one of: a spring and a bellows.

16. The system of claim 10, wherein:
the pipe includes a tunnel operable to transport steam; and
the valve-actuator assembly is one of a plurality of valve-actuator assemblies in a machine operable to produce paper.

17. A method, comprising:
selecting one or more dimensions for at least one of a valve and a resilient member, the valve operable to control a flow of material, the resilient member operable to facilitate movement of the valve;
determining, using the one or more dimensions, whether forces to be applied against the valve and the resilient member by pressures from the material would be approximately balanced when the valve is in each of a plurality of positions, the plurality of positions including a most open position and a most closed position;
if the forces would not be approximately balanced, modifying at least one of the one or more dimensions; and
if the forces would be approximately balanced, providing an actuator-valve assembly having the valve and a housing containing the resilient member with the one or more dimensions for use in a process control system, the actuator-valve assembly including a stem coupling the valve to an endplate, the stem positioned to pass through a flange and operable to move with respect to the flange, the resilient member positioned between the flange and the endplate, wherein no seal is present where the stem passes through the flange such that at least some of the material is able to enter a portion of the housing through an area between the stem and the flange;
wherein the forces are approximately balanced only as a function of pressure from the material being applied against the valve and pressure of the material entering the portion of the housing between the stem and the flange being applied against the resilient member.

18. The method of claim 17, wherein:
the valve includes a first surface associated with the stem, a second surface associated with an outlet of the actuator-valve assembly, and a tapered or contoured third surface between the first and second surfaces; and
the one or more dimensions include at least one of: a cross-sectional area or diameter of the resilient member, a cross-sectional area or diameter of the stem, an area or diameter of the first surface, an area or diameter of the second surface, and a taper or contour of the third surface.

19. The method of claim 17, wherein the forces that are approximately balanced include only (i) a force against a first surface associated with the stem, (ii) a force against a second surface associated with the outlet, (iii) a force against a tapered or contoured third surface between the first and second surfaces, and (iv) a force against the resilient member.

20. The method of claim 17, wherein no venting of backpressure or vacuum caused by movement of an actuator in the actuator-valve assembly occurs.

21. The method of claim 17, wherein determining whether the forces to be applied would be approximately balanced includes determining whether the forces to be applied against the valve and the resilient member by the pressures from the material would be approximately balanced at each of multiple positions of the valve in the valve-actuator assembly.

* * * * *